(12) United States Patent
Miyashita et al.

(10) Patent No.: US 10,356,419 B2
(45) Date of Patent: Jul. 16, 2019

(54) ENCODING DEVICE AND ENCODING METHOD

(71) Applicant: Hitachi Kokusai Electric Inc., Minato-ku, Tokyo (JP)

(72) Inventors: Atsushi Miyashita, Tokyo (JP); Hiroyuki Takesue, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 0 days.

(21) Appl. No.: 15/555,246

(22) PCT Filed: Feb. 9, 2016

(86) PCT No.: PCT/JP2016/053781
§ 371 (c)(1),
(2) Date: Sep. 1, 2017

(87) PCT Pub. No.: WO2016/158017
PCT Pub. Date: Oct. 6, 2016

(65) Prior Publication Data
US 2018/0343451 A1 Nov. 29, 2018

(30) Foreign Application Priority Data
Mar. 27, 2015 (JP) .................................. 2015-065389

(51) Int. Cl.
*H04N 19/139* (2014.01)
*H04N 19/103* (2014.01)
(Continued)

(52) U.S. Cl.
CPC ......... *H04N 19/139* (2014.11); *H04N 19/103* (2014.11); *H04N 19/176* (2014.11);
(Continued)

(58) Field of Classification Search
CPC .... H04N 19/176; H04N 19/61; H04N 19/103; H04N 19/11; H04N 19/112;
(Continued)

(56) References Cited

U.S. PATENT DOCUMENTS

| 5,301,019 A | 4/1994 | Citta | |
|---|---|---|---|
| 2003/0227493 A1* | 12/2003 | Yokomizo | H04N 19/20 715/867 |

(Continued)

FOREIGN PATENT DOCUMENTS

| EP | 0542153 A2 | 5/1993 |
|---|---|---|
| EP | 2028840 A2 | 2/2009 |

(Continued)

OTHER PUBLICATIONS

International Search Report and Written Opinion from International Application No. PCT/JP2016/053781 dated May 10, 2016.

(Continued)

*Primary Examiner* — Nathnael Aynalem
(74) *Attorney, Agent, or Firm* — Brundidge & Stanger, P.C.

(57) ABSTRACT

Problem: The purpose of the present invention is to improve the accuracy of detecting a motion involved in video signal encoding. Solution: This encoding device has a video signal input unit and a status information input unit for a camera angle and the zoom magnification of a lens, the encoding device being characterized in being provided with a control unit and an encoding unit, the encoding unit having an I processing unit, a P processing unit, a selection unit, a buffer memory unit, a decoding unit, a motion correlation unit, a weighting unit, and a determination unit, the weighting unit altering weighting in accordance with status information, the selection unit selecting one among the output of the I (Continued)

processing unit, the output of the P processing unit, and the output of the determination unit.

2 Claims, 14 Drawing Sheets

(51) Int. Cl.
    *H04N 19/51*     (2014.01)
    *H04N 19/513*     (2014.01)
    *H04N 19/176*     (2014.01)
    *H04N 19/61*     (2014.01)
    *H04N 19/107*     (2014.01)
    *H04N 19/137*     (2014.01)

(52) U.S. Cl.
    CPC ............. *H04N 19/51* (2014.11); *H04N 19/61* (2014.11); *H04N 19/107* (2014.11); *H04N 19/137* (2014.11)

(58) Field of Classification Search
    CPC .... H04N 19/124; H04N 19/13; H04N 19/139; H04N 19/14; H04N 19/146; H04N 19/172; H04N 19/174; H04N 19/194; H04N 19/50; H04N 19/56
    See application file for complete search history.

(56) References Cited

U.S. PATENT DOCUMENTS

| | | | |
|---|---|---|---|
| 2004/0028282 A1* | 2/2004 | Kato | H04N 19/176 382/236 |
| 2004/0125204 A1* | 7/2004 | Yamada | H04N 19/197 348/97 |
| 2007/0040917 A1* | 2/2007 | Kobayashi | H04N 19/197 348/222.1 |
| 2010/0026829 A1* | 2/2010 | Maruyama | H04N 19/105 348/222.1 |
| 2013/0039416 A1* | 2/2013 | Someya | H04N 19/597 375/240.12 |
| 2014/0267808 A1* | 9/2014 | Kuwata | H04N 19/56 348/208.6 |

FOREIGN PATENT DOCUMENTS

| | | |
|---|---|---|
| JP | 10-257366 A | 9/1998 |
| JP | 2005-229262 A | 8/2005 |
| JP | 2008-211508 A | 9/2008 |
| JP | 2011-87270 A | 4/2011 |

OTHER PUBLICATIONS

International Search Report for European Application No. 16771901.2-1209 dated Aug. 30, 2018, 8 pages.

* cited by examiner (A) RUNNERS PHOTOGRAPHED BY TELEPHOTO MODE (B) RUNNERS PHOTOGRAPHED BY WIDE-ANGLE MODE (A) ANGLE AND VIEW ANGLE (B) DISPLAY SCREEN

|  |  | PLUS = RIGHT MINUS = LEFT | | |
| --- | --- | --- | --- | --- |
| A(°) | Z(°) | L END | Center | R END |
| −30 | 45 | 0.26 | −0.50 | −0.97 |
| −30 | 20 | −0.17 | −0.50 | −0.77 |
| −30 | 10 | −0.34 | −0.50 | −0.64 |
| 0 | 45 | 0.71 | 0.00 | −0.71 |
| 0 | 20 | 0.34 | 0.00 | −0.34 |
| 0 | 10 | 0.17 | 0.00 | −0.71 |
| 30 | 45 | 0.97 | 0.50 | −0.26 |
| 30 | 20 | 0.77 | 0.50 | 0.17 |
| 30 | 10 | 0.64 | 0.50 | 0.34 |
| 45 | 45 | 1.00 | 0.71 | 0.00 |
| 45 | 20 | 0.91 | 0.71 | 0.42 |
| 45 | 10 | 0.82 | 0.71 | 0.57 |
| 90 | 45 | 0.71 | 1.00 | 0.71 |
| 90 | 20 | 0.94 | 1.00 | 0.94 |
| 90 | 10 | 0.98 | 1.00 | 0.98 |

(C) HORIZONTAL MOTION VECTOR BY VIEW ANGLE

ENCODING DEVICE AND ENCODING METHOD

TECHNICAL FIELD

The present invention relates to an encoding device and an encoding method.

BACKGROUND ART

Conventionally, moving image encoding such as moving picture experts group phase1 (MPEG1), MPEG2, H.264 or H.265 is configured to determine which of a motion compensating prediction error signal and an in-frame pixel signal it is advantageous to subject to discrete cosine transform (DCT) for each small block (16×16). Determination is made using one having smaller in-block variance. A selected signal is subjected to DCT conversion, for example. The DCT coefficient is quantized in a quantization step set for each block, and then allocates a variable length code to a quantization representative value. For allocating a variable length code also to motion vector information, a code is allocated to a difference vector from a vector in the vicinity, for improvement in efficiency.

As a citation list, PATENT LITERATURE 1 discloses a technique of a compressed image processing device which has an image recognition function or an image composition function, for example, for data of a compressed and coded image and can exchange background image data.

CITATION LIST

Patent Literature

PATENT LITERATURE 1: JP 2005-229262 A

SUMMARY OF INVENTION

Technical Problem

The object of the present invention is to improve the accuracy of detecting a motion vector involved in video signal encoding.

Solution to Problem

An encoding device of the present invention is an encoding device having a video signal input unit and a status information input unit for a camera angle and a zoom magnification of a lens, the encoding device including: a control unit; and an encoding unit, wherein the encoding unit includes an I processing unit, a P processing unit, a selection unit, a buffer memory unit, a decoding unit, a motion correlation unit, a weighting unit and a determination unit, the weighting unit alters weighting in accordance with the status information, and the selection unit selects one among output of the I processing unit, output of the P processing unit, and output of a determination unit.

Moreover, an encoding device of the present invention is the above-described encoding device, wherein the encoding unit further includes a motion correction unit, and the motion correction unit generates video data subjected to motion correction based on output of the determination unit and video data decoded by the decoding unit.

Moreover, an encoding method of the present invention includes a step of performing I processing of image data; a step of performing P processing of image data; a motion correlation data detection step of detecting a matching degree of image data from current image data and image data of a previous frame; a step of altering weighting of the matching degree from status information of a camera angle and a zoom magnification of a lens; a step of determining a peak of the motion correlation data and generating motion data; a step of generating a motion amount and a corrected image based on motion data; and a selection step of selecting one among I-processed data, P-processed data and motion data.

Furthermore, an encoding method of the present invention is the above-described encoding method, further including a decoding step of decoding data selected in the selection step; and a motion correction step of performing motion correction of data decoded in the decoding step.

Advantageous Effects of Invention

According to the present invention, it is possible to improve the accuracy of detecting a motion vector involved in video signal encoding.

DESCRIPTION OF EMBODIMENTS

The following description will explain an embodiment of the present invention in detail with reference to the drawings.

An encoding device of an embodiment of the present invention is configured to improve the accuracy of detecting a motion and reduce the processing amount by reflecting status information such as the zoom magnification of a lens and a photographing direction (angle) of a camera to motion correction in the process of encoding a video signal outputted from a camera mounted on a mobile body such as an outside broadcast van.

Figure 1:
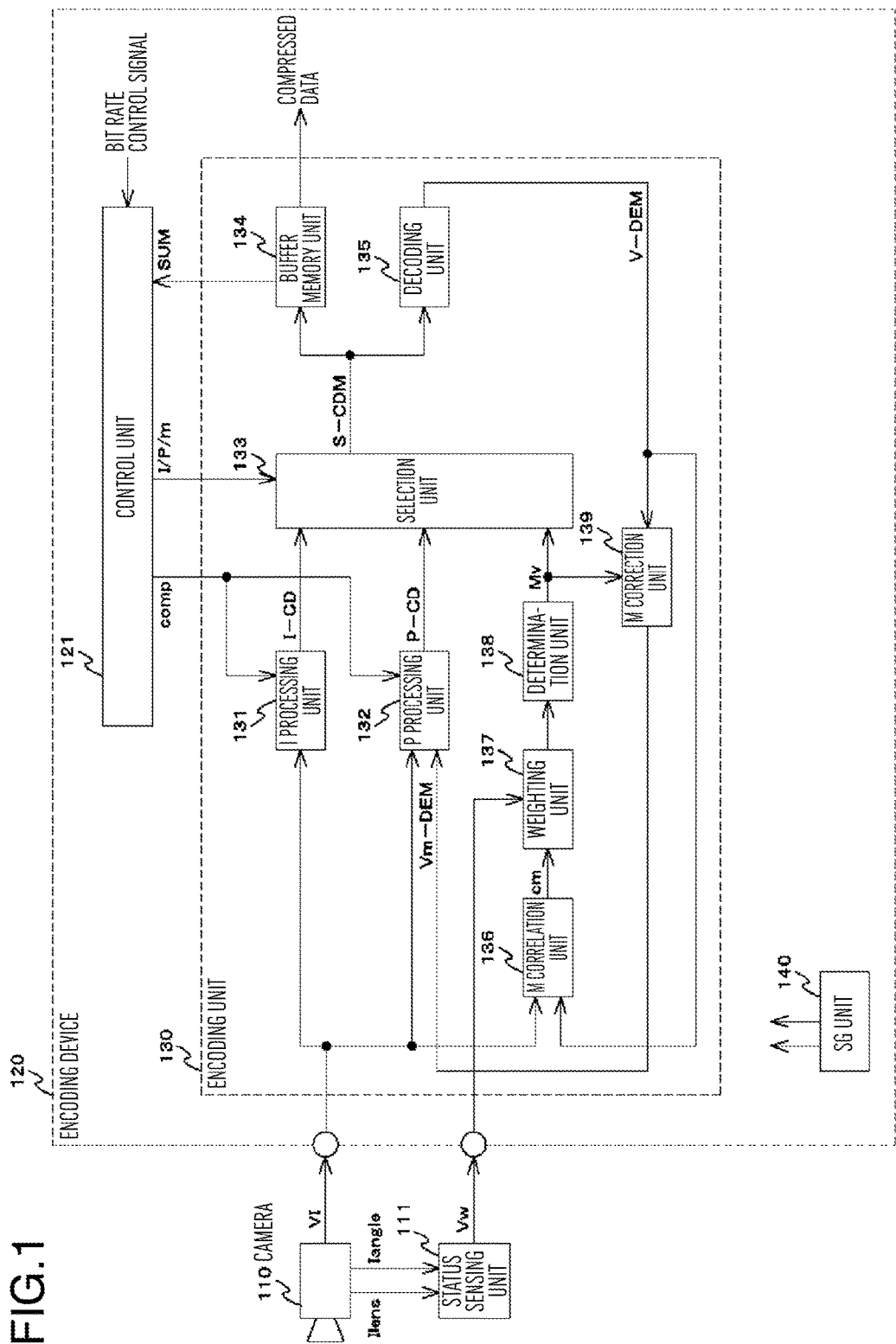
FIG. 1 is a block diagram for explaining an encoding device according to an example of the present invention.

FIG. 1 is a block diagram for explaining an encoding device according to an example of the present invention.

In FIG. 1, an encoding device 120 is connected with a camera 110 and a status sensing unit 111. It is to be noted that the status sensing unit 111 may be incorporated in the encoding device 120.

The encoding device 120 has a video signal input unit to which a video signal VI is inputted, and a status information input unit to which status information Vw is inputted.

The status sensing unit 111 outputs an angle Iangle, which is a photographing direction of the camera 110, and status information Vw, which is generated by sensing a zoom magnification Ilens of a lens connected with the camera 110, to a weighting unit 137 of the encoding device 120.

The encoding device 120 is composed of a control unit 121, an encoding unit 130, and a sync generator (SG) unit 140.

A bit rate control signal and an SUM are inputted into the control unit 121, and the control unit 121 outputs a comp control signal and an I/P/m control signal.

The encoding unit 130 configured to perform image compression is composed of an I (Intra-coded Picture) processing unit 131, a P (Predictive-coded Picture) processing unit 132, a selection unit 133, a buffer memory unit 134, a decoding unit 135, an M (Moving, motion) correlation unit 136, a weighting unit 137, a determination unit 138 and an M (Moving, motion) correction unit 139.

The SG unit 140 is configured to supply a synchronous signal to the whole of the encoding device 120.

The encoding unit 130 generates compressed data I-CD at the I processing unit 131 from an inputted video signal VI, generates compressed data P-CD at the P processing unit 132, generates motion data Mv at the M correlation unit 136, the weighting unit 137 and the determination unit 138, selects the compressed data I-CD or P-CD or the motion data Mv at the selection unit 133, outputs selected data S-CDM to the buffer memory unit 134, and outputs compressed data from the buffer memory unit 134. It is to be noted that the decoding unit 135 decodes S-CDM, and outputs a decoded video signal V-DEM to the M correlation unit 136.

The M correction unit 139 generates a video signal Vm-DEM from motion data Mv and a video signal V-DEM, and outputs the generated video signal Vm-DEM to the P processing unit 132.

A comp control signal to be outputted from the control unit 121 is a control signal for increasing or decreasing the generated code amount of I processing and P processing, and the I processing unit and the P processing unit are configured to increase or decrease the generated code amount by changing the coarseness of quantization.

Moreover, an I/P/M control signal to be outputted from the control unit 121 is a control signal to the selection unit 133, and is a signal of selecting data I-CD by I processing, data P-CD of P processing, or motion data Mv.

Moreover, an SUM to be inputted into the control unit 121 is a signal related to the compressed data amount stored in the buffer memory unit 134.

The control unit 121 controls the coarseness of quantization, that is, the amount of newly generated data with a comp control signal while checking the amount of SUM.

(Description on I Processing Unit)

Figure 2:
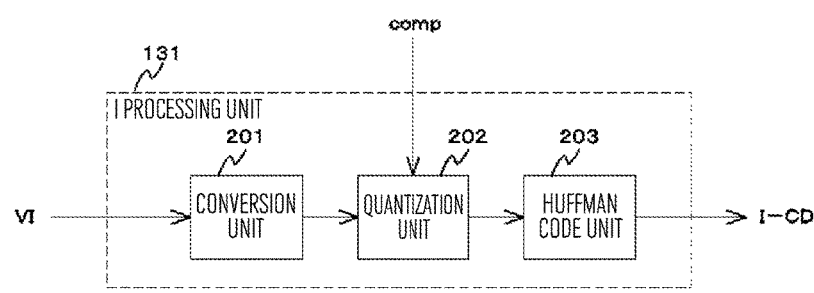
FIG. 2 is a block diagram for explaining an I processing unit.

FIG. 2 is a block diagram for explaining the I processing unit.

In FIG. 2, the I processing unit 131 is composed of a conversion unit 201, a quantization unit 202 and a Huffman code unit 203, and subjects an inputted video signal VI to discrete cosine transform (DCT) conversion, for example, at the conversion unit 201, creates compressed data I-CD at the quantization unit 202 and the Huffman code unit 203, and outputs the compressed data I-CD.

(Description on P Processing Unit)

Figure 3:
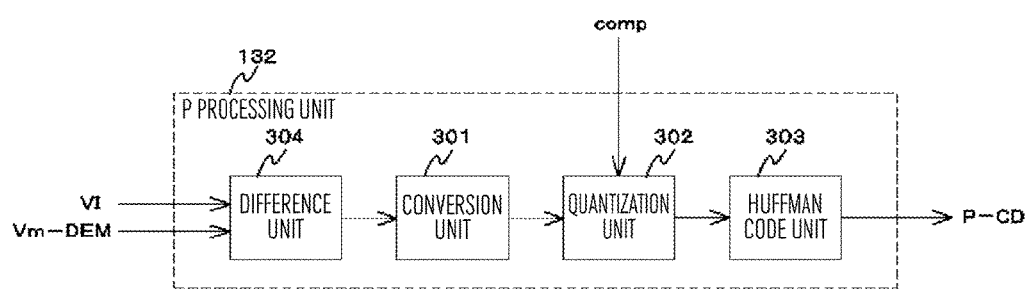
FIG. 3 is a block diagram for explaining a P processing unit.

FIG. 3 is a block diagram for explaining the P processing unit.

In FIG. 3, the P processing unit 132 is composed of a difference unit 304, a conversion unit 301, a quantization unit 302 and a Huffman code unit 303, obtains a difference between a video signal VI of an inputted current frame and a video signal Vm-DEM of a previous frame at the difference unit 304, subjects a video signal of the difference to discrete cosine transform (DCT) conversion, for example, at the conversion unit 301, creates compressed data P-CD at the quantization unit 302 and the Huffman code unit 303, and outputs the compressed data P-CD.

It is to be noted that a Huffman code unit is recently sometimes called as an Entropy encoding unit or the like.

(Description on M Correlation Unit)

Figure 4:
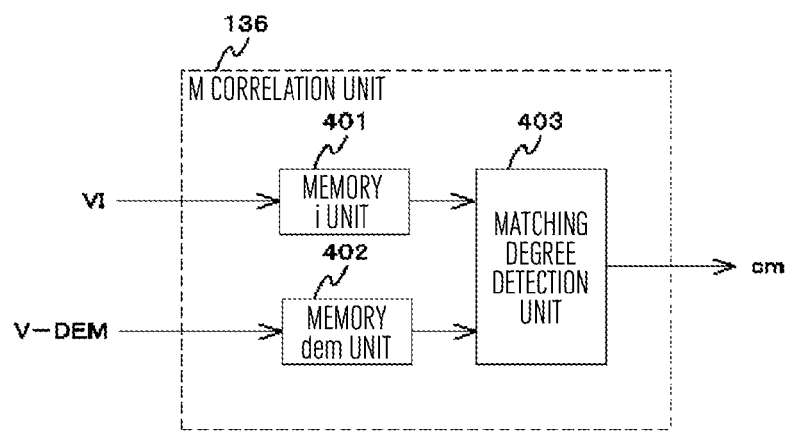
FIG. 4 is a block diagram for explaining an M correlation unit.

FIG. 4 is a block diagram for explaining the M correlation unit.

In FIG. 4, the M correlation unit 136 is composed of a memory i unit 401, a memory dem unit 402 and a matching degree detection unit 403.

The memory i unit 401 stores a video signal VI, and outputs the video signal VI to the matching degree detection unit 403.

The memory dem unit 402 stores a video signal V-DEM, and outputs the video signal V-DEM to the matching degree detection unit 403.

The matching degree detection unit 403 detects a matching degree of a video signal VI and a video signal V-DEM, and outputs a detected matching degree signal cm. The matching degree signal cm will be hereinafter explained using an example having a pixel number of 3×3 and a motion search range of ±1, though an actual machine often uses a large block such as a pixel number of 8×8 and a wide search range such as ±7, for example.

(Description on Determination Unit)

Figure 5:
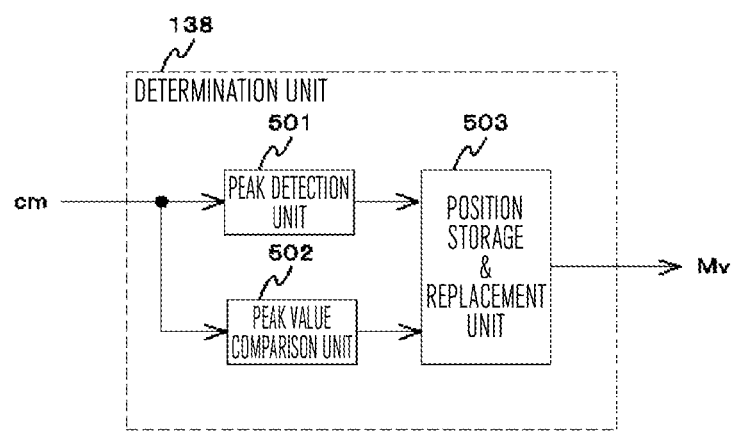
FIG. 5 is a block diagram for explaining a determination unit.

FIG. 5 is a block diagram for explaining the determination unit.

In FIG. 5, the determination unit 138 is composed of a peak detection unit 501, a peak value comparison unit 502 and a position storage & replacement unit 503.

The peak detection unit 501 detects a peak from a matching degree signal cm, and outputs the peak to the position storage & replacement unit 503.

The peak value comparison unit 502 compares a peak value based on a matching degree signal cm, and outputs the peak value to the position storage & replacement unit 503.

The position storage & replacement unit 503 outputs motion data My based on signals outputted from the peak detection unit 501 and the peak value comparison unit 502.

(Description on Image by Difference in Camera Angle)

Figure 6:
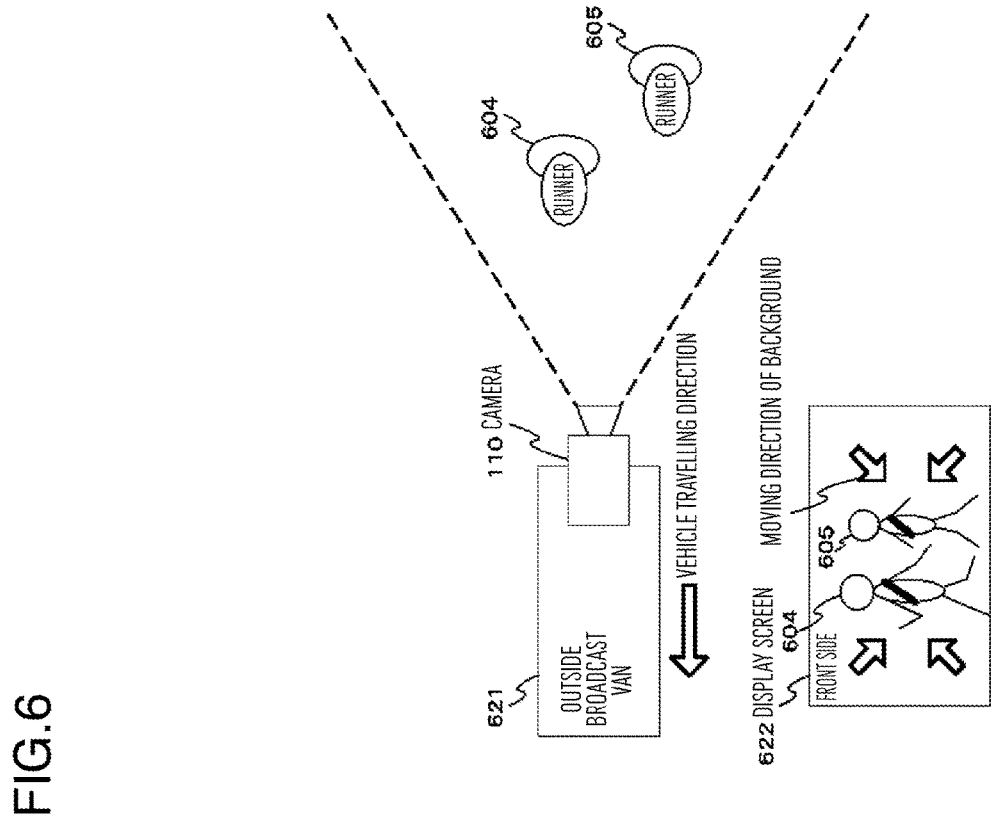
FIG. 6 is a view for explaining an image by difference in the angle of a moving camera.
Figure 6:
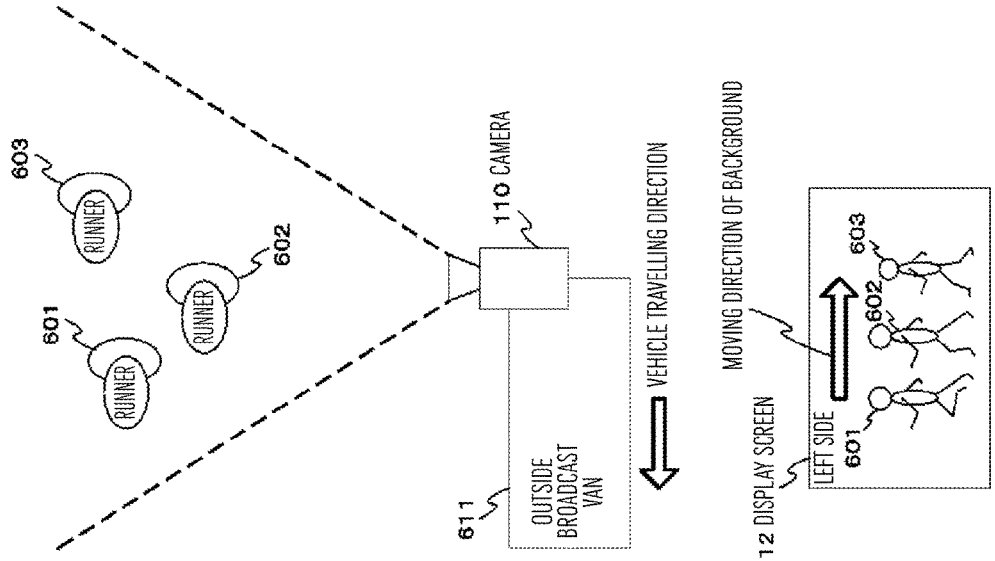

FIG. 6 is a view for explaining an image by difference in the angle of a moving camera.

FIG. 6(A) is a case where an outside broadcast van 611 on which a camera 110 is mounted photographs runners 601-603 in a marathon race, a long-distance relay race or the like from the left side.

A display screen 612 displays an image photographed by the camera 110, wherein the runners 601-603 are in a nearly still state while motion of the background from the left to the right is large.

FIG. 6(B) is a case where an outside broadcast van 621 on which the camera 110 is mounted photographs runners 604, 605 in a marathon race, a long-distance relay race or the like from the front side.

A display screen 622 displays an image photographed by the camera 110, wherein the runners 604, 605 are in a nearly still state while motion of the background from the center to the outer periphery is large.

(Description on Image by Difference in View Angle of Moving Camera)

Figure 7:
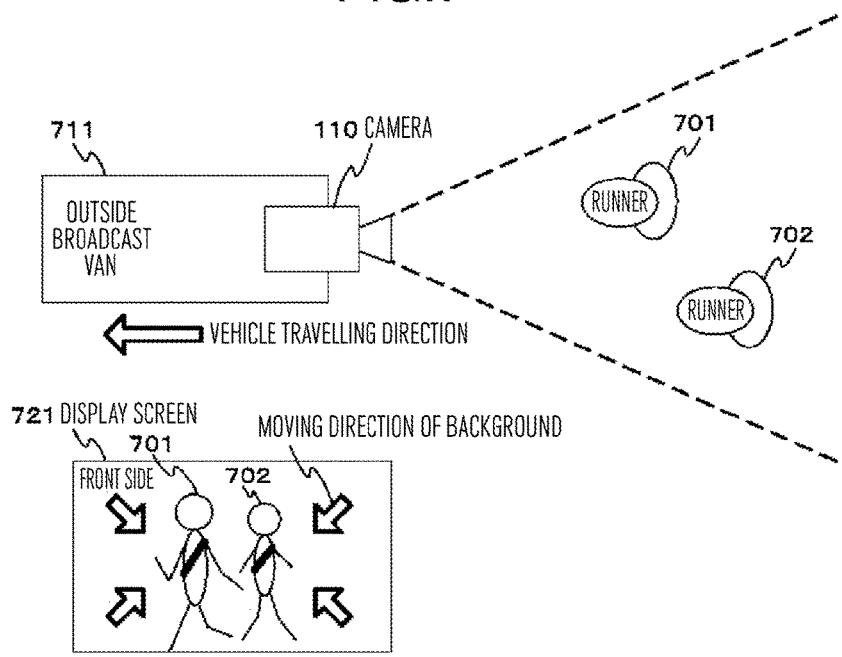
FIG. 7 is a view for explaining an image by difference in the view angle of a moving camera.
Figure 7:
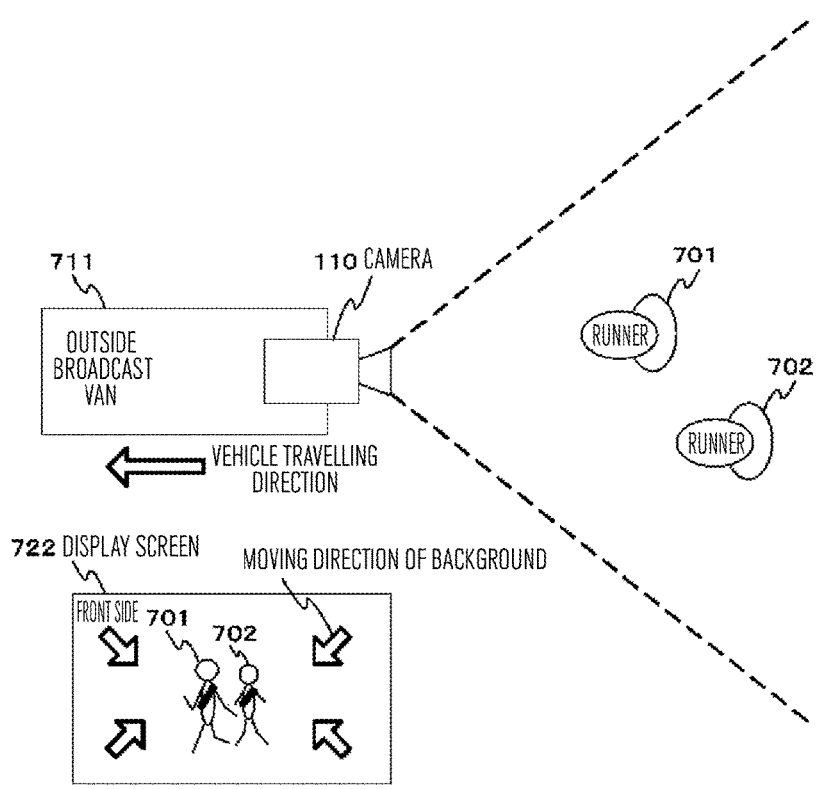

FIG. 7 is a view for explaining an image by difference in the view angle of a moving camera.

FIG. 7(A) is a case where an outside broadcast van 711 on which the camera 110 is mounted photographs runners 701, 702 in a marathon race, a long-distance relay race or the like from the front side, and the lens is set at a telephoto mode (the zoom magnification is set at 10 times, for example).

A display screen 721 displays an image photographed by the camera 110, wherein the runners 701, 702 are displayed large in a nearly still state while motion of the background from the center to the outer periphery exists.

FIG. 7(B) is a case where the outside broadcast van 711 on which the camera 110 is mounted photographs the runners 701, 702 in a marathon race, a long-distance relay race or the like from the front side, and the lens is set at a wide-angle mode (the zoom magnification is set at 1 time, for example).

A display screen 722 displays an image photographed by the camera 110, wherein the runners 701, 702 are displayed small in a nearly still state while motion of the background from the center to the outer periphery exists.

(Description on Lowering of Horizontal Motion Vector by View Angle)

Figure 8:
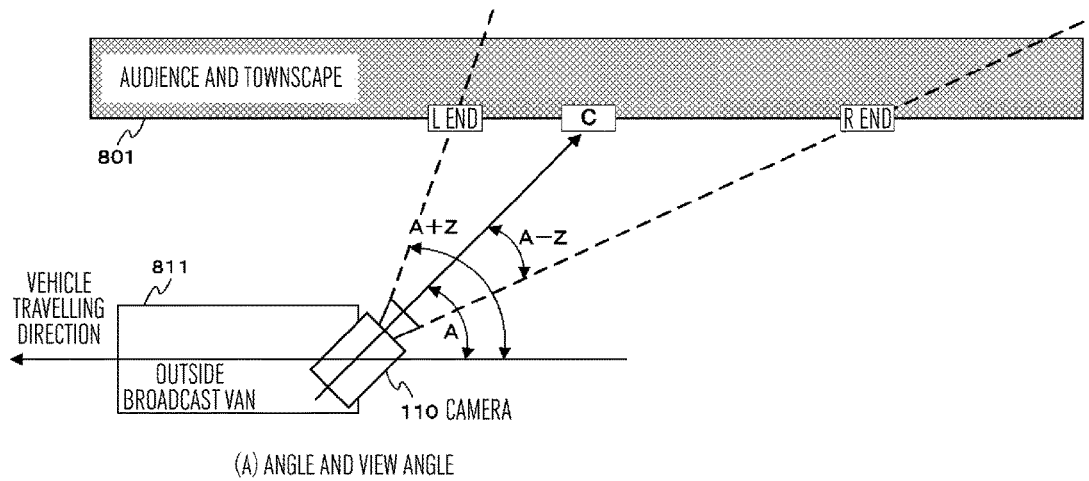
FIG. 8 is a view for explaining lowering of a horizontal motion vector by the view angle of an encoding device according to an example of the present invention.
Figure 8:
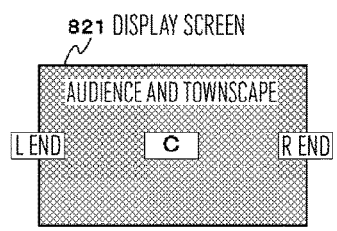

FIG. 8 is a view for explaining lowering of a horizontal motion vector by the view angle of an encoding device according to an example of the present invention.

FIG. 8(A) is a view for explaining an angle of a camera and a view angle.

In FIG. 8(A), the camera 110 sets an angle (photographing direction) in a travelling direction of an outside broadcast van 811 to A°, a photographing direction to C (Center), the L (Left) end of the photographing direction to +Z°, and the R (Right) end of the photographing direction to −Z°. The background is the audience and townscape 801.

FIG. 8(B) is a display screen 821 of a case where a camera of FIG. 8(A) is used. The L end is the left end of the display screen 821, C is the center of the display screen 821, and the R end is the right end of the display screen 821.

Since the outside broadcast van 811 is travelling, the audience and townscape 801 in the display screen 821 move from the left to the right when A is plus, or moves from the right to the left when A is minus.

FIG. 8(C) is a table view for explaining lowering of a horizontal motion vector by the view angle of a camera.

When A is 30° and Z is 45° in FIG. 8(C), for example, the motion vector lowers to 0.97 at the L end, 0.50 at the Center, and −0.26 at the R end.

It is to be noted that the lowering table of a horizontal motion vector by the view angle of FIG. 8(C) is stored in the weighting unit 137, for example.

(Description on Operations of Encoding Device)

(Still Image Case)

Next, the operations of an encoding device according to an example of the present invention will be described.

Figure 9A:
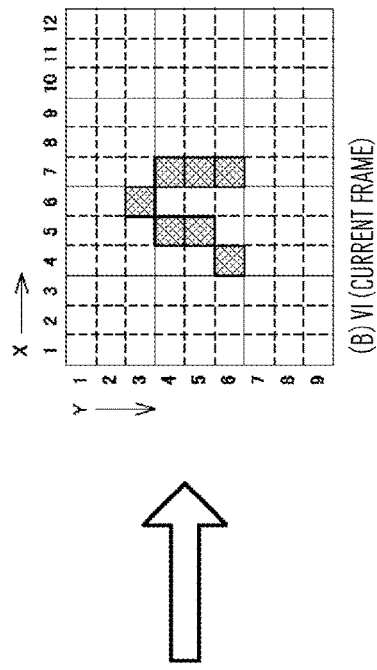
FIG. 9A is a view for explaining the operations in a case of a still image of an encoding device according to an example of the present invention.
Figure 9A:
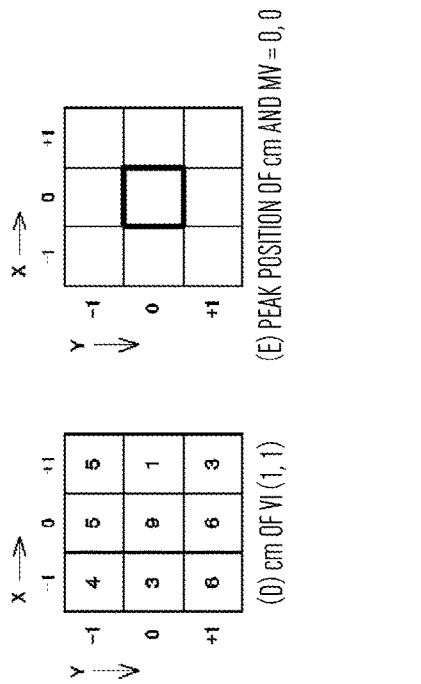
Figure 9A:
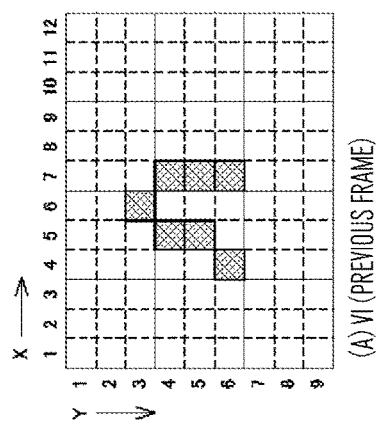
Figure 9A:
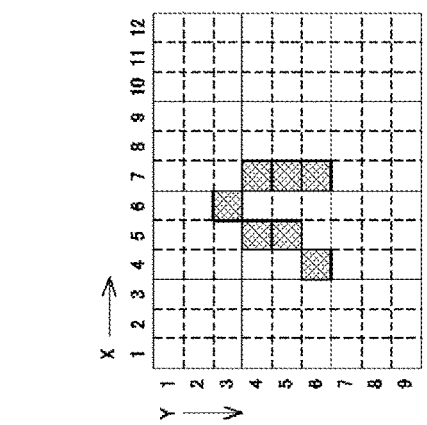

FIG. 9A is a view for explaining the operations in a case of a still image of an encoding device according to an example of the present invention.

Figure 9B:
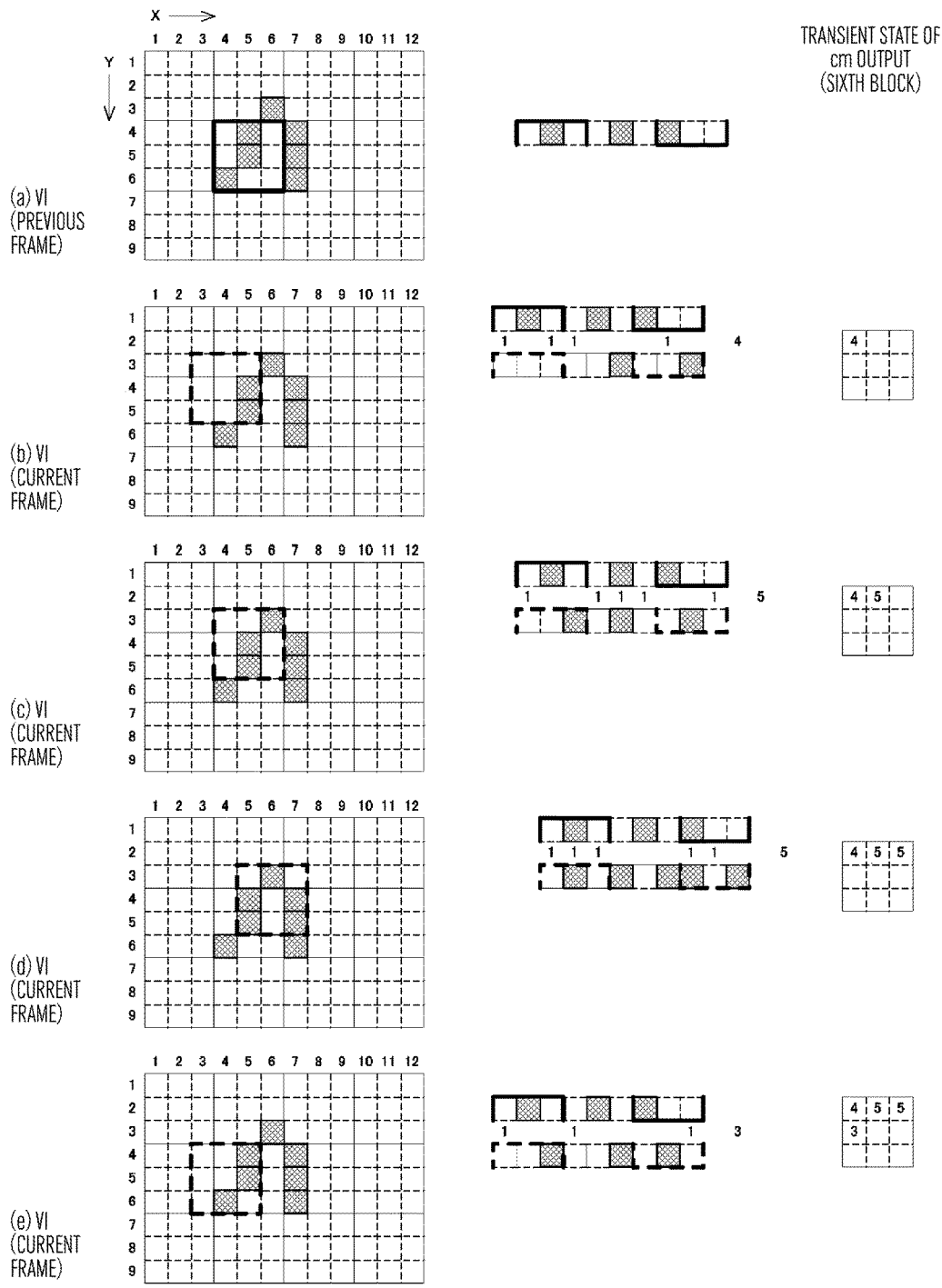
FIG. 9B is a view (First) for explaining the process procedures of detecting a matching degree signal cm of FIG. 9A.

FIG. 9B is a view (First) for explaining the process procedures of detecting a matching degree signal cm of FIG. 9A.

Figure 9C:
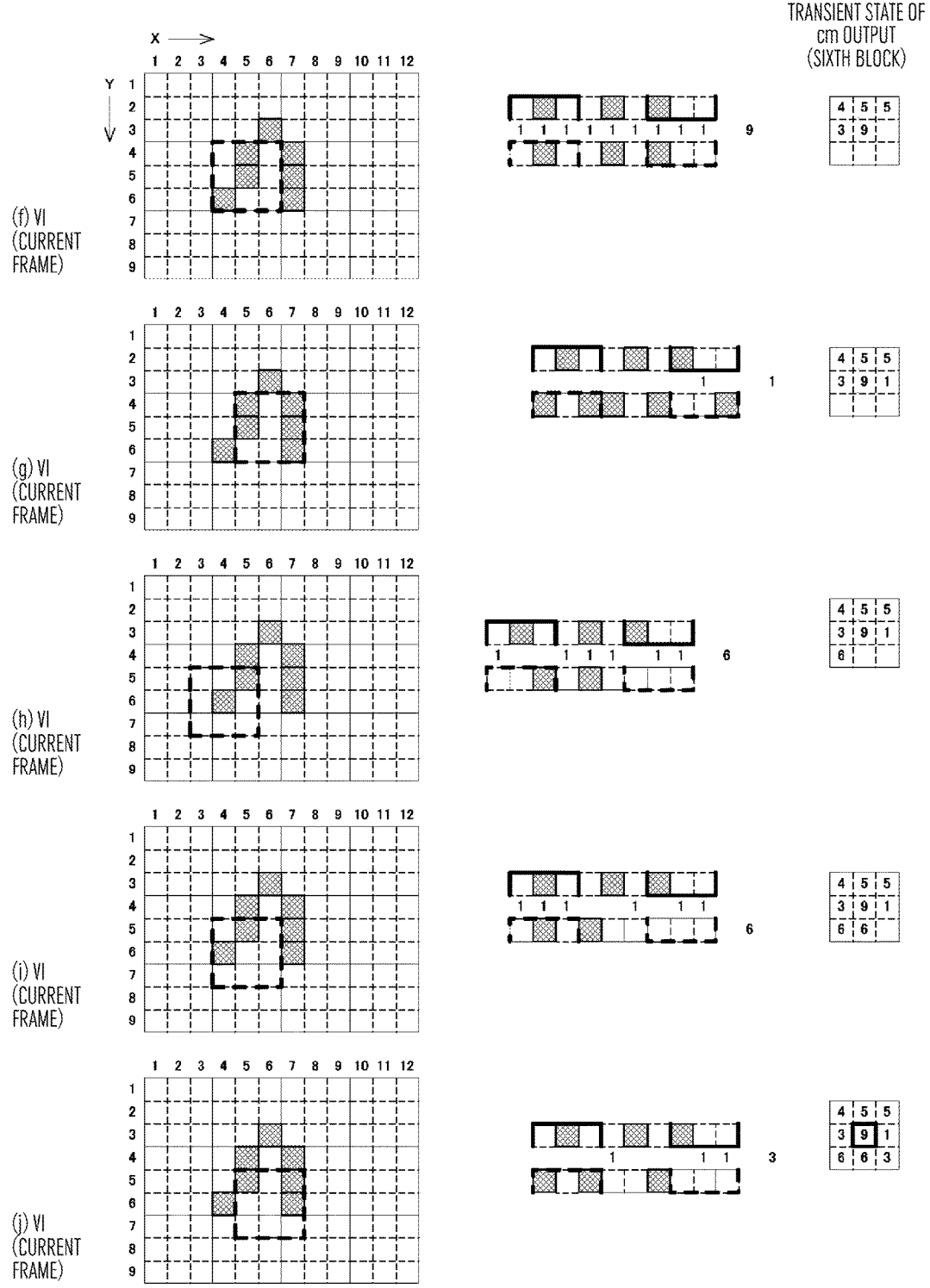
FIG. 9C is a view (Second) for explaining the process procedures of detecting a matching degree signal cm of FIG. 9A.

FIG. 9C is a view (Second) for explaining the process procedures of detecting a matching degree signal cm of FIG. 9A.

Figure 9D:
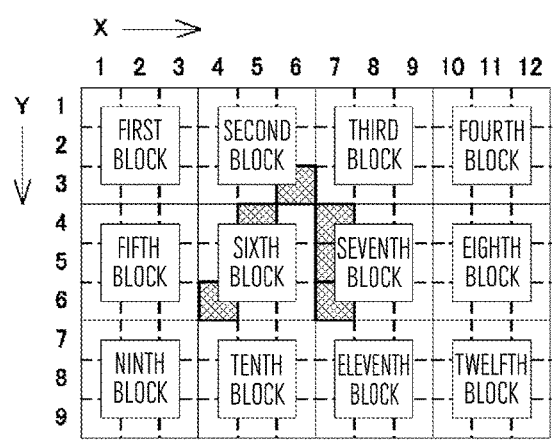
FIG. 9D is a view for explaining blocks of FIGS. 9A and 10A.
Figure 10A:
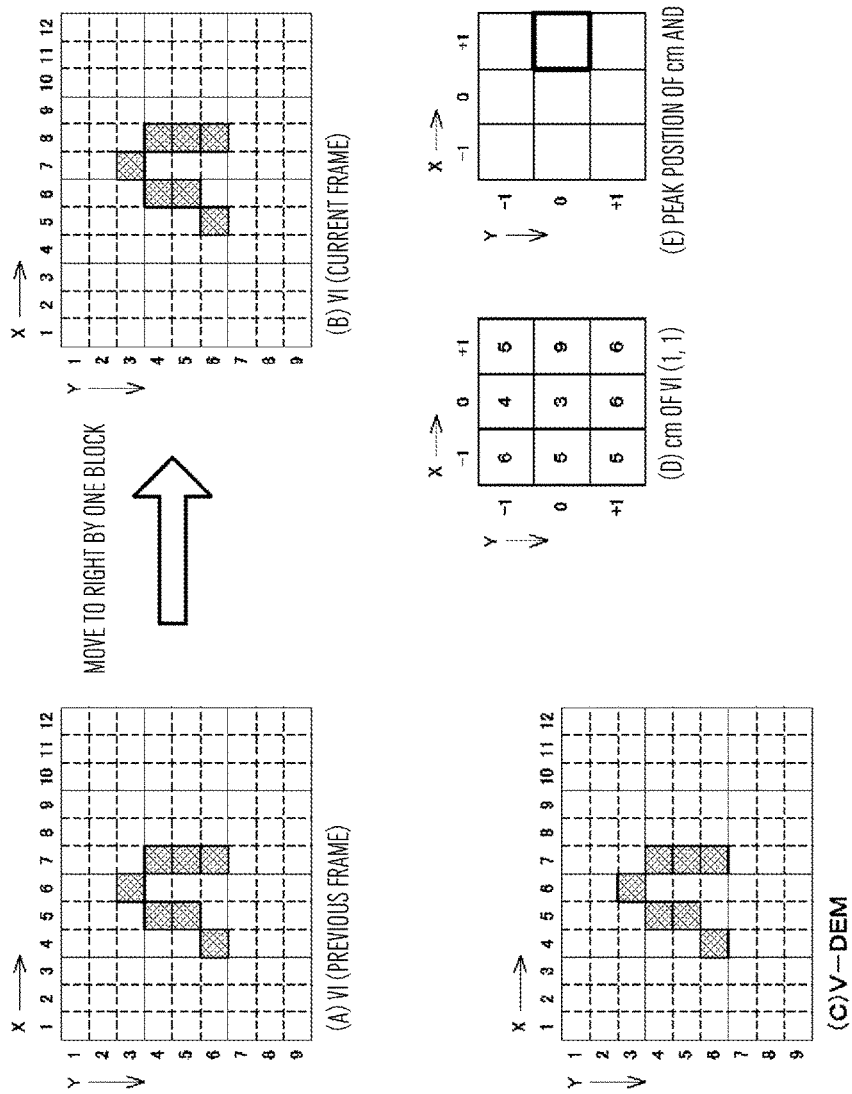
FIG. 10A is a view for explaining the operations in a case of a moving image of an encoding device according to an example of the present invention.

FIG. 9D is a view for explaining blocks of FIGS. 9A and 10A.

FIG. 9A(A) is a view which two-dimensionally shows a video signal VI of a previous frame outputted from the camera 110.

FIG. 9A(B) is a view which two-dimensionally shows a video signal VI of a current frame outputted from the camera 110.

In FIGS. 9A(A) and 9A(B), the image size is 12 pixels×9 pixels, the abscissa is X, the ordinate is Y, and the numerical values indicate an address. Expression is to be VI (X, Y).

FIG. 9A(C) is a view which two-dimensionally shows a video signal V-DEM outputted from the decoding unit 135.

Since a video signal VI outputted from the camera 110 is a still image, FIGS. 9A(A), 9A(B) and 9A(C) are the same video signal.

FIG. 9A(D) is a view for explaining a matching degree signal cm to be outputted from the M correlation unit 136.

In FIG. 4, the memory i unit 401 of the M correlation unit 136 stores a video signal VI, and the memory dem unit 402 stores a video signal V-DEM.

The matching degree detection unit 403 detects a matching degree of a video signal VI to be outputted from the memory i unit 401 and a video signal V-DEM to be outputted from the memory dem unit 402, calculates a matching degree of X, Y=(−1, −1), then calculates a matching degree regarding X, Y=0, −1, X, Y=+1, −1 . . . , and outputs a matching degree signal cm obtained from matrix detection of 3×3.

Regarding the above output of a matching degree signal cm, a matching degree is detected as illustrated in FIGS. 9B and 9C, for example. Since FIG. 9A(D) shows a matching degree signal cm of VI (1, 1) and a video signal VI is a still image, the matching degree reaches the highest value at the position of cm (0, 0).

FIG. 9A(E) is a view for explaining motion data My to be outputted from the determination unit 138.

Regarding a signal to be inputted into the determination unit 138, a matching degree signal cm to be outputted from the M correlation unit 136 is multiplied by a predetermined coefficient at the weighting unit 137.

The coefficient to be used for multiplication at the weighting unit 137 is based on a table of a horizontal motion vector by a view angle of FIG. 8(C).

In a case where A of the camera 110 is 30°, Z is 45° and the screen position is the L end, for example, a matching degree signal cm is multiplied by 0.97. Moreover, in a case where A of the camera 110 is 30°, Z is 45° and the screen position is the R end, a matching degree signal cm is multiplied by 0.26 (absolute value of −0.26).

In FIG. 5, regarding a weighted matching degree signal cm inputted into the determination unit 138, a peak is detected at the peak detection unit 501, the matching degree signal cm is compared with a matching degree signal cm of a previous frame at the peak value comparison unit 502, and is inputted into the position storage & replacement unit 503.

The position storage & replacement unit 503 stores, replaces and outputs the peak position in a case where a matching degree signal cm includes an effective correlation value reaching a predetermined peak.

FIG. 9A(E) is a case where a peak position is stored and replacement by Mv=0, 0 is performed since a matching degree signal cm includes an effective correlation value reaching a predetermined peak.

It is to be noted that a storage unit configured to store the position of a peak and a replacement table to be used for replacement are provided in the position storage & replacement unit 503, for example.

The processing of FIG. 9A is performed for each block of FIG. 9D, for example.

(Moving Image Case)

FIG. 10A is a view for explaining the operations in a case of a moving image of an encoding device according to an example of the present invention.

Figure 10B:
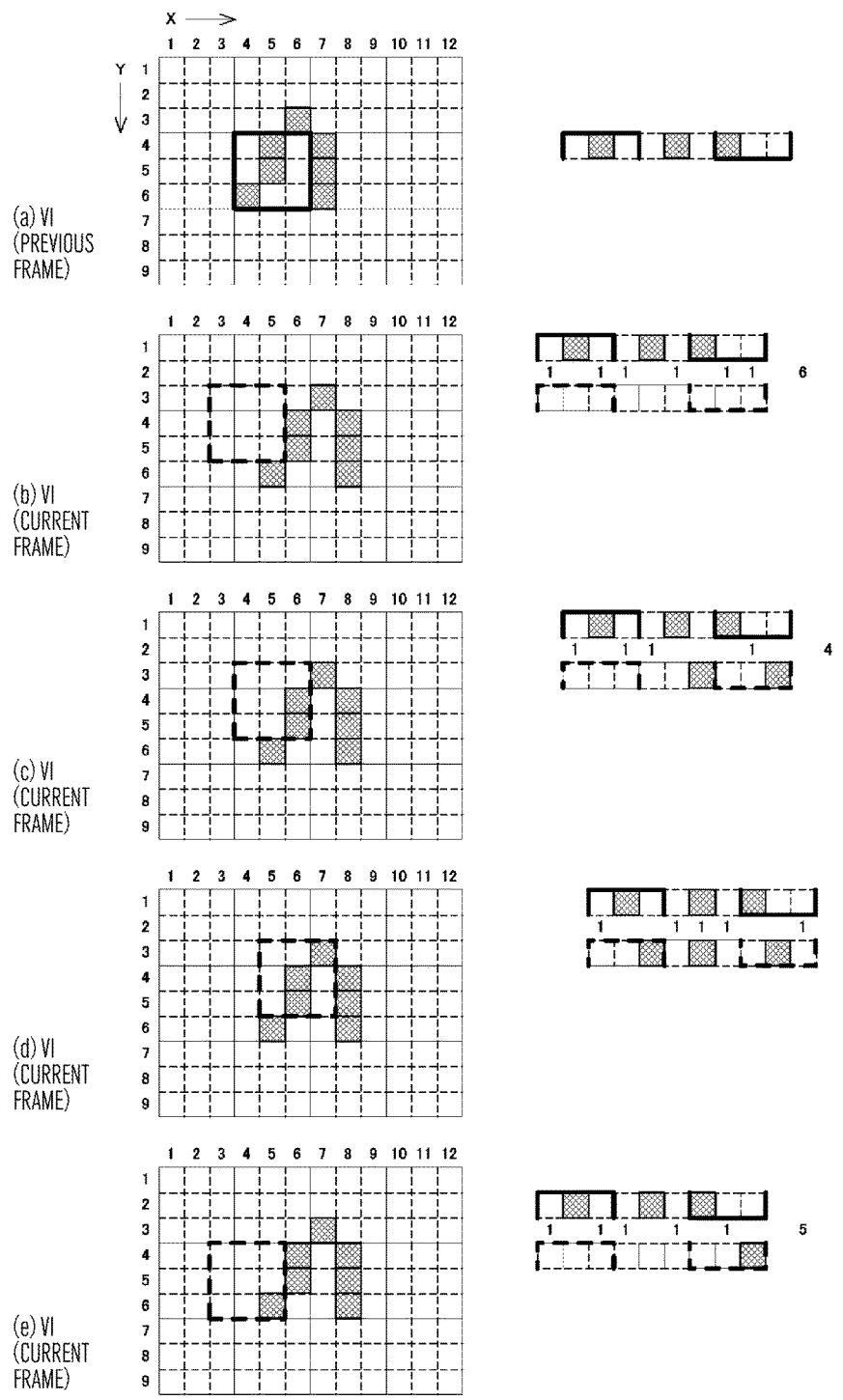
FIG. 10B is a view (First) for explaining the process procedures of detecting a matching degree signal cm of FIG. 10A.

FIG. 10B is a view (First) for explaining the process procedures of detecting a matching degree signal cm of FIG. 10A.

Figure 10C:
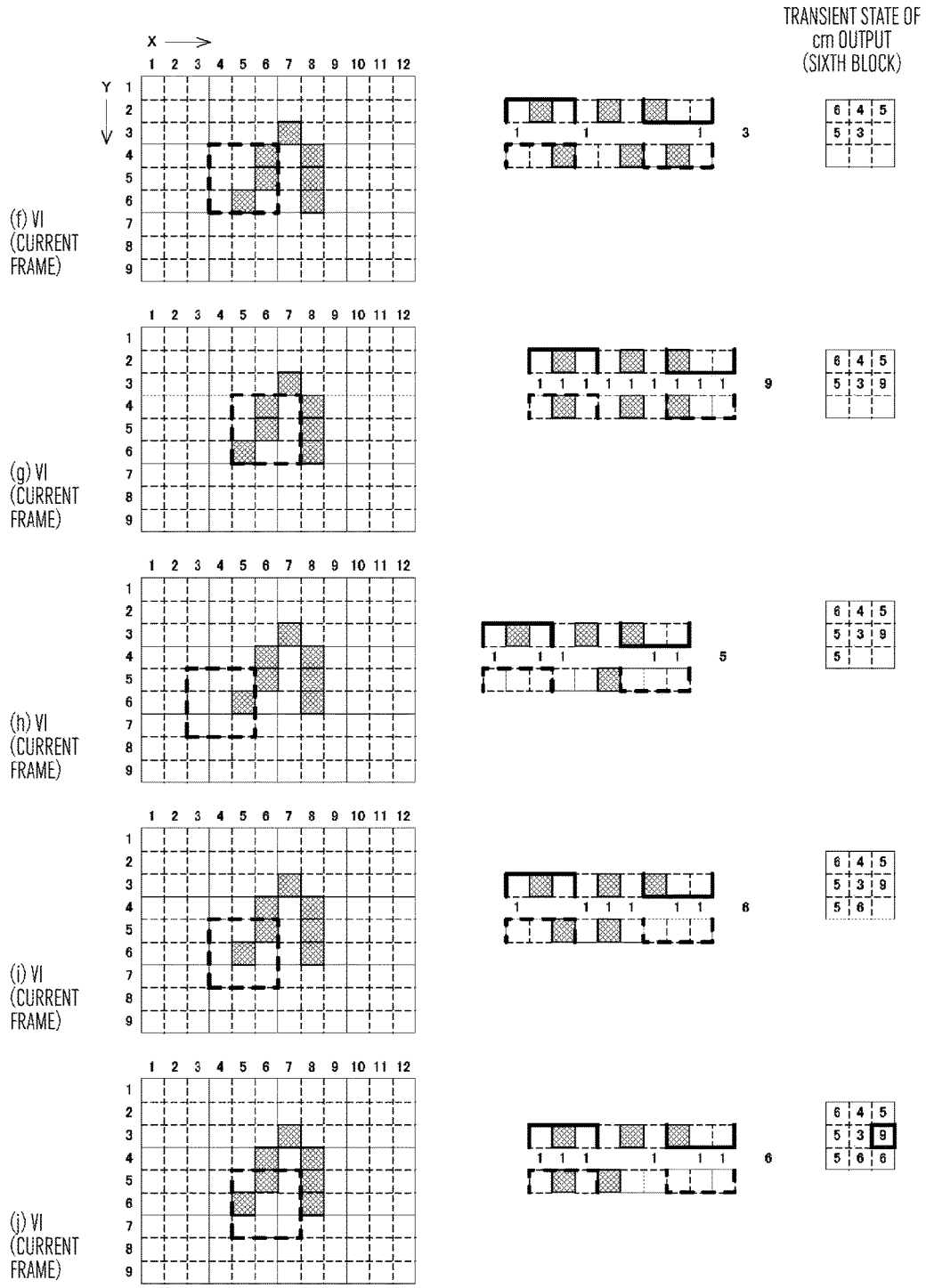
FIG. 10C is a view (Second) for explaining the process procedures of detecting a matching degree signal cm of FIG. 10A.

FIG. 10C is a view (Second) for explaining the process procedures of detecting a matching degree signal cm of FIG. 10A.

FIG. 10A(A) is a view which two-dimensionally shows a video signal VI of a previous frame outputted from the camera 110.

FIG. 10A(B) is a view which two-dimensionally shows a video signal VI of a current flame outputted from the camera 110. FIG. 10A(B) is a case moved from FIG. 10A(A) to the right by one block.

In FIGS. 10A(A) and 10A(B), the image size is 12 pixels×9 pixels, the abscissa is X, the ordinate is Y, and the numerical values indicate an address. Expression is to be VI (X, Y).

FIG. 10A(C) is a view which two-dimensionally shows a video signal V-DEM outputted from the decoding unit 135.

FIG. 10A(D) is a view for explaining a matching degree signal cm to be outputted from the M correlation unit 136.

In FIG. 4, the memory i unit 401 of the M correlation unit 136 stores a video signal VI, and the memory dem unit 402 stores a video signal V-DEM.

The matching degree detection unit 403 detects a matching degree of a video signal VI to be outputted from the memory i unit 401 and a video signal V-DEM to be outputted from the memory dem unit 402, calculates a matching degree of X, Y=(−1, −1) as with the above case of a still image, then calculates a matching degree regarding X, Y=0, −1, X, Y=+1, −1 . . . , and outputs a matching degree signal cm obtained from matrix detection of 3×3.

Regarding the above output of a matching degree signal cm, a matching degree is detected as illustrated in FIGS. 10B and 10C, for example. Since FIG. 10A(D) shows a matching degree signal cm of VI (1, 1) and a video signal VI is a moving image, the matching degree reaches the highest value at the position of cm (1, 0).

FIG. 10A(E) is a view for explaining motion data My to be outputted from the determination unit 138.

Regarding a signal to be inputted into the determination unit 138, a matching degree signal cm to be outputted from the M correlation unit 136 is multiplied by a predetermined coefficient at the weighting unit 137.

The coefficient to be used for multiplication at the weighting unit 137 is based on a table of a horizontal motion vector by a view angle of FIG. 8(C).

In a case where A of the camera 110 is 30°, Z is 45° and the screen position is the L end, for example, a matching degree signal cm is multiplied by 0.97. In a case where A of the camera 110 is 30°, Z is 45° and the screen position is the R end, a matching degree signal cm is multiplied by 0.26 (absolute value of −0.26).

In FIG. 5, regarding a weighted matching degree signal cm inputted into the determination unit 138, a peak is detected at the peak detection unit 501, and the matching degree signal cm is compared with a matching degree signal cm of a previous frame at the peak value comparison unit 502 and is inputted into the position storage & replacement unit 503.

The position storage & replacement unit 503 stores a peak position in a case where a matching degree signal cm includes an effective correlation value reaching a predetermined peak, or replaces the signal by Mv=0, 0 and outputs the obtained signal in a case where a matching degree signal cm does not include an effective correlation value reaching a predetermined peak. Even when a matching degree signal cm includes an effective correlation value image reaching a predetermined peak in ideal comparison, it is to be noted that a matching degree signal cm sometimes does not include an effective correlation value reaching a predetermined peak depending on photographing conditions, the quality thereof or the like. In such a case, the signal can be replaced by Mv=0, 0 and outputted, or a predetermined peak value can be changed depending on the situation suitably considering photographing conditions or the like.

FIG. 10A(E) is a case where a peak position is stored and replaced by Mv=1, 0 since a matching degree signal cm sometimes includes an effective correlation value reaching a predetermined peak.

An encoding device of an embodiment of the present invention can enhance the accuracy of detecting a motion vector and reduce the processing amount of a motion vector by applying a photographing direction (angle) of a camera and the zoom magnification of a lens to weighting of motion vector detection when the camera is in mobile photographing.

Figure 11:
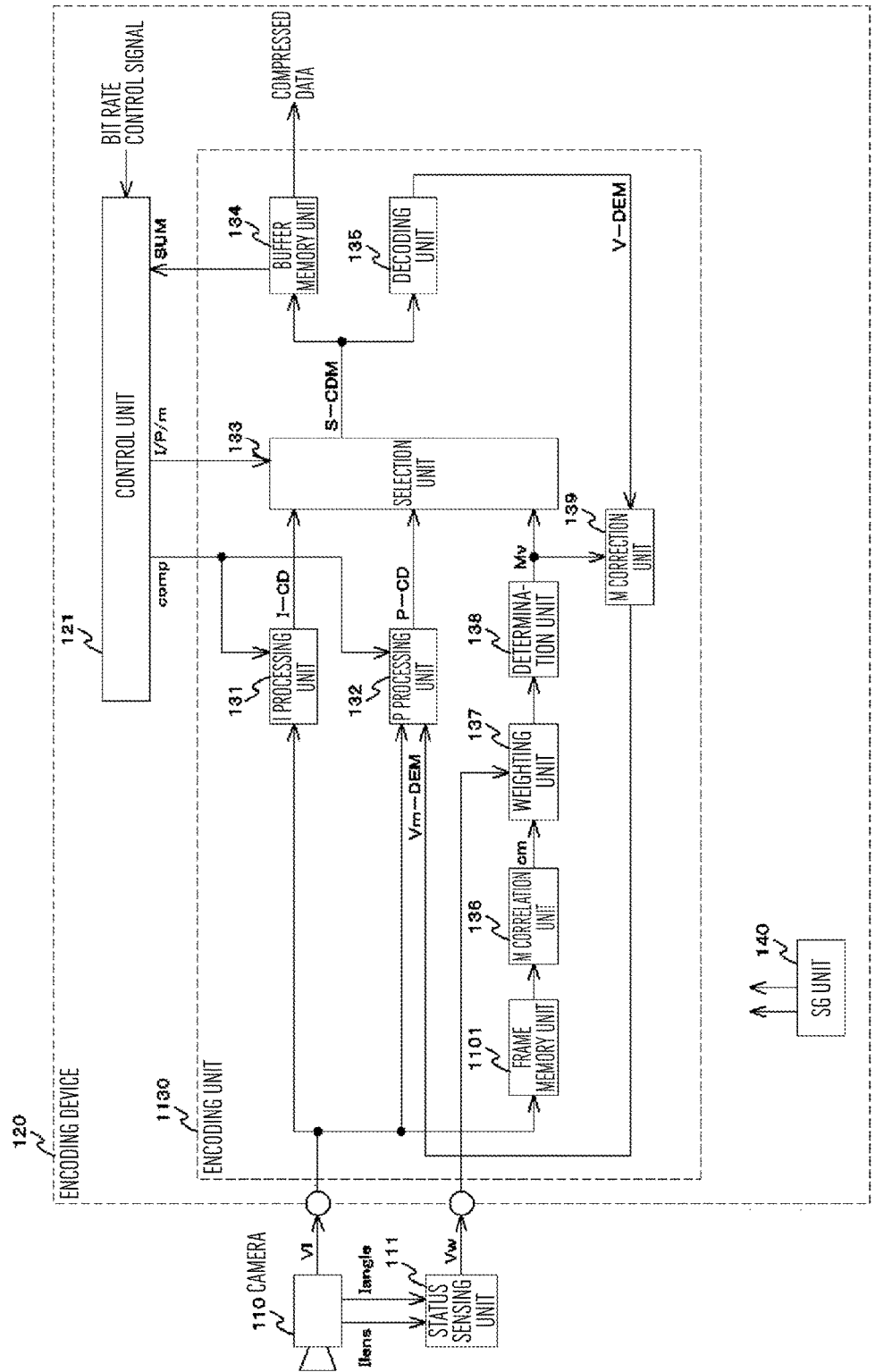
FIG. 11 is a block diagram for explaining an encoding device according to another example of the present invention.

As illustrated in FIG. 11, M correlation may be configured to use a signal which is obtained by delaying an input VI by one frame. It is to be noted that denoted at 1101 is a frame memory unit configured to delay an input VI by one frame.

Although the above description has explained the present invention in detail, the present invention is not limited to an encoding device described herein but clearly can be applied widely to other encoding devices.

It is to be noted that an encoding device of an embodiment of the present invention may be a part of a field pickup unit (FPU) or the like.

The present application is based on and claims benefit of priority of Japanese Patent Application No. 2015-065389 filed on Mar. 27, 2015, which is all hereby incorporated by reference.

INDUSTRIAL APPLICABILITY

Since the motion amount of image data can be generated by fewer processes, the present invention can be applied to generate compressed data from a video signal of a high-pixel camera such as 4K (3,840 lateral pixels×2,160 longitudinal pixels) or 8K (7,680 lateral pixels×4,320 longitudinal pixels).

REFERENCE SIGNS LIST

110 Camera
111 Status Sensing Unit
120 Encoding Device
121 Control Unit
130 Encoding Unit
131 I Processing Unit
132 P Processing Unit
133 Selection Unit
134 Buffer Memory Unit
135 Decoding Unit
136 M Correlation Unit
137 Weighting Unit
138 Determination Unit
139 M Correction Unit
140 SG Unit
201, 301 Conversion Unit
202, 302 Quantization Unit
203, 303 Huffman Code Unit
304 Difference Unit
401 Memory i Unit
402 Memory dem Unit
403 Matching Degree Detection Unit
501 Peak Detection Unit
502 Peak Value Comparison Unit
503 Position Storage & Replacement Unit

The invention claimed is:

1. An encoding device including a video signal input unit for inputting a video signal output from a camera mounted on a mobile device including an outside broadcast van and a status information input unit for a camera angle and a zoom magnification of a lens, the encoding device comprising:
   a control unit; and
   an encoding unit,
      wherein the encoding unit includes an I processing unit, a P processing unit, a motion correlation unit, a weighting unit, a determination unit, a selection unit, a buffer memory unit, and a decoding unit,
      wherein the I processing unit performs an I processing based on a video signal input from the video signal input unit to output data Intra-coded Picture—CD (I-CD);
      wherein the P processing unit performs a P processing based on the video signal input from the video signal input unit and a video signal of a previous frame to output data Predictive-coded Picture—CD (P-CD);
      wherein the motion correlation unit outputs a matching degree signal based on the video signal input from the video signal input unit and a video signal of the previous frame;
      wherein the weighting unit weights the signal from the motion correlation unit in accordance with the camera angle and the zoom magnification of the lens from the status information input unit to output the weighted signal;
      wherein the determination unit determines whether the signal from the weighting unit includes a correlation value as to whether a matching degree reaches a predetermined peak and if the correlation value is an effective correlation value, then motion data My replaced is output;
      wherein the selection unit selects at least one of: output of the I processing unit, output of the P processing unit, or output of the determination unit based on an Intra-coded Picture/Predictive-code Picture/Moving, motion (I/P/m) control signal from the control unit;
      wherein the buffer memory unit temporally stores the signal output from the selection unit and outputs a signal on an amount of a compressed data of the stored signal to the control unit and outputs the compressed data;
      wherein the decoding unit decodes the signal output from the selection unit and feedbacks the decoded signal, as a video signal of the previous frame, into the motion correlation unit; and
      wherein the control unit inputs a bit rate control signal and SUM which is a signal on an amount of the compressed data stored in the buffer memory unit, and the control unit outputs a comp control signal and the I/P/m control signal to the selection unit for selecting at least one of: the data I-CD of the I processing, the data P-CD of the P processing, or the motion data Mv, the comp control signal being a control signal for increasing or decreasing a generated code amount of the I processing and the P processing.

2. The encoding device according to claim 1, wherein the encoding unit further includes a motion correction unit, and
wherein the motion correction unit generates video data subjected to motion correction based on a branch signal from output of the determination unit and video data decoded by the decoding unit, and output the generated video data, as a video signal of the previous frame, to the P processing unit.

* * * * *